US005892296A

United States Patent [19]

Lafonta

[11] Patent Number: 5,892,296

[45] Date of Patent: Apr. 6, 1999

[54] CIRCUIT FOR CYCLICALLY DRIVING SEVERAL LOADS

[75] Inventor: Paul Lafonta, Paris, France

[73] Assignees: Electronic Art Gallery Elektronische Werbemittel GmbH, Germany; Loupi S.A.R.L., France

[21] Appl. No.: 747,678

[22] Filed: Nov. 12, 1996

[30] Foreign Application Priority Data

Nov. 24, 1995 [DE] Germany ....................... 295 18 640 U

[51] Int. Cl.[6] ........................................ H02J 3/14

[52] U.S. Cl. .......................... 307/38; 307/41; 315/209 R; 315/323

[58] Field of Search ................................ 307/38, 11, 41; 315/209 R, 323

[56] References Cited

U.S. PATENT DOCUMENTS

| | | | |
|---|---|---|---|
| 3,601,620 | 8/1971 | Gee | 307/41 |
| 3,793,531 | 2/1974 | Ferrigno | 307/41 |
| 4,215,277 | 7/1980 | Weiner et al. | 315/323 |
| 4,514,727 | 4/1985 | Van Antwerp . | |
| 4,780,621 | 10/1988 | Bartleucci et al. | 307/11 |
| 5,300,864 | 4/1994 | Allen | 307/41 |

FOREIGN PATENT DOCUMENTS

| | | |
|---|---|---|
| 2477705 | 9/1981 | France . |
| 4000954 | 7/1991 | Germany . |
| 1073815 | 9/1987 | Japan . |
| 5273939 | 3/1992 | Japan . |
| 6297769 | 4/1993 | Japan . |
| 7212197 | 1/1994 | Japan . |

OTHER PUBLICATIONS

Holtek HT205a Five Lamp/LED Flash Driver Brochure (May 24, 1994).

EP 96 11 7383 Search Report of Jan. 24, 1997.

*Primary Examiner*—Albert W. Paladini

*Attorney, Agent, or Firm*—Diller, Ramik & Wight, PC

[57] ABSTRACT

A basic circuit (10) includes an oscillator (11) whose frequency can be set via a frequency-determining component (15). At outputs (A1–A5), the basic circuit (10) cyclically generates pulses by which consumers (L1–L5) are driven. A switch (18) is connected in parallel to the frequency-determining component (15), said switch being controlled by the outputs (A1–A5) and changing the oscillator frequency during an output pulse. Thus, the output pulses change the oscillator frequency and thus their own pulse duration themselves.

7 Claims, 1 Drawing Sheet

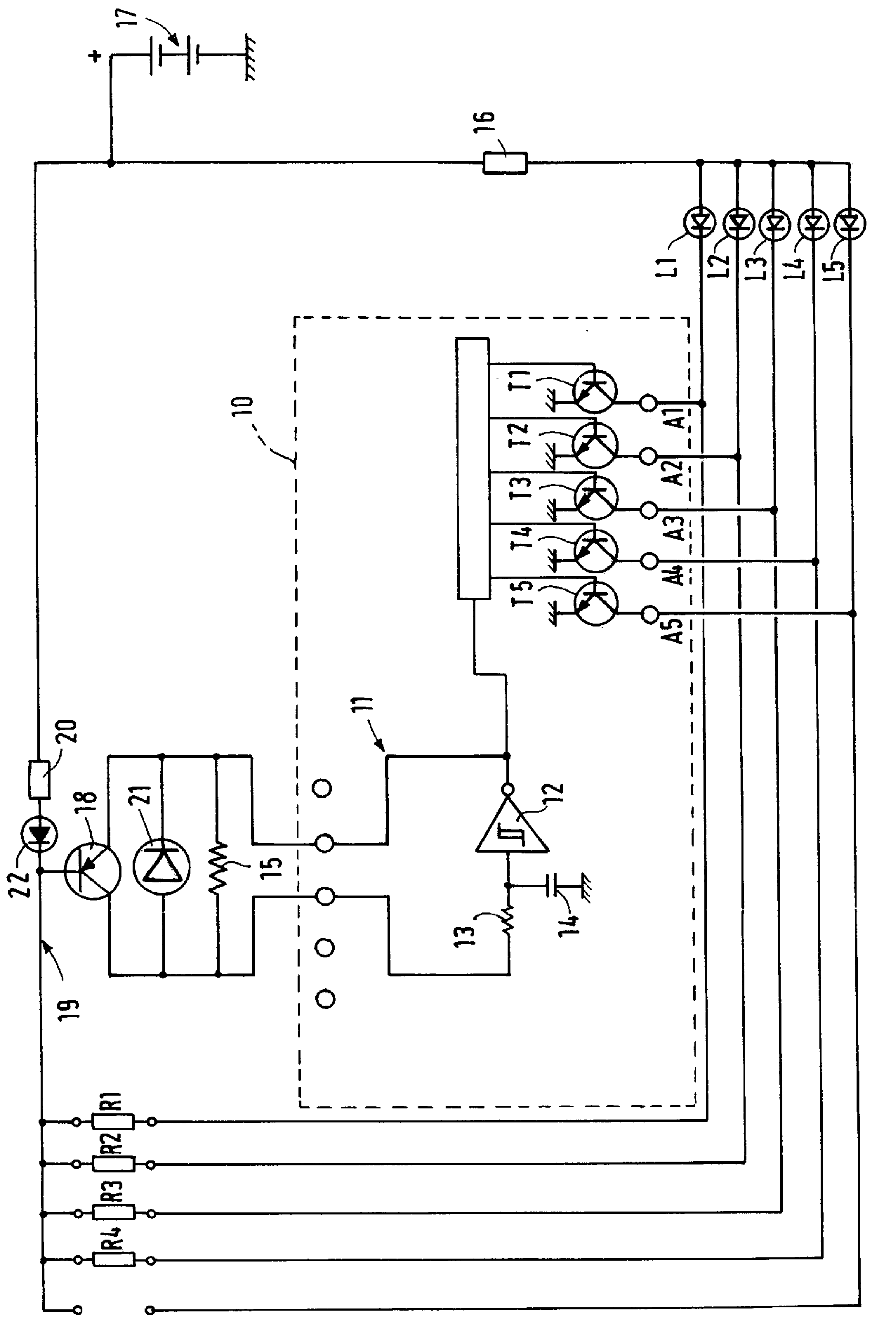
17
16
L1
L2
L3
L4
L5
10
T1
T2
T3
T4
T5
A1
A2
A3
A4
A5
11
12
13
14
15
18
19
20
21
22
R1
R2
R3
R4

CIRCUIT FOR CYCLICALLY DRIVING SEVERAL LOADS

BACKGROUND OF THE INVENTION

The invention relates to a circuitry for cyclically driving several loads, comprising a basic circuit including an oscillator and successively generating pulses at several outputs, the oscillator comprising a frequency-determining component.

Circuits by which loads in the form of LEDs are cyclically driven are known. Such circuits are used in displays or ornaments, for example. The LEDs are driven by a basic circuit which, for example, is configured as an integrated circuit. The basic circuit comprises several outputs to which different LEDs are connected. In operation, the basic circuit cyclically generates pulses at the outputs so that the LEDs connected to different outputs light up. The repetition rate at which the LEDs are activated depends on the value of a frequency-determining component which is externally connected to the integrated circuit. Usually, this component is a resistor. If the resistance value is high, the repetition rate is low; and if the resistance value is low, the repetition rate of the pulses is high. With this kind of drive, all LEDs are driven by pulses of the same duration. When the LEDs have different colors, this results in different luminosities because the effectiveness of, e.g., a blue LED is lower than that of a red LED. Therefore, the blue LEDs glow less intensely than the red LEDs.

SUMMARY OF THE INVENTION

It is the object of an invention to provide a circuit for cyclically driving several loads which allows, by simple means, to individually rate the power supplied to the individual loads during a drive pulse and thereby compensate for, e.g., different efficiencies of the loads.

The circuit of the invention is based on the principle of known circuits driving the individual loads with pulses of the same length. According to the invention, the frequency-determining component determining the oscillator frequency is assigned a switch by which the oscillator frequency may be temporarily changed, i.e., whenever the switch is in the conductive state. This switch is controlled by the outputs of the basic circuit. Therefore, it is possible to not connect e.g. a specific output of the basic circuit to the switch so that the pulse generated at this output does not change the oscillator frequency. Another output of the basic circuit, however, can be connected to the switch. If then a pulse of ground potential occurs at this output, the oscillator frequency is increased for the duration of this pulse only, whereby the pulse, in a way, shortens itself.

When the circuit is used to drive LEDs having different colors, the blue LEDs, for example, can be operated with a pulse duration corresponding to the normal (unchanged) oscillator frequency, whereas those pulses driving the red LEDs increase the oscillator frequency and thus shorten the pulse duration of the red LEDs. Thus, it is achieved that the red LEDs are provided with less electric energy than the blue LEDs. Since the blue LEDs, however, have a much lower electrooptical and visual efficiency than the red LEDs, both types of LEDs seem to have about the same luminosity.

By means of the invention, however, it is also possible to drive similar LEDs, e.g., exclusively red LEDs, in such a manner that these LEDs have individually different illumination durations.

In the simplest case, the switch by which the oscillator frequency is changed is connected in parallel to the frequency-determining component together with a resistor. A preferred embodiment of the invention provides that the switch is connected as a current source. Such a switch consists of a transistor in base circuit. This transistor is controlled by the output pulses of the basic circuit and it generates a current intensity individually depending on the respective output being activated. Thus, the durations of the individual pulses by which the loads are driven are individually influenced, the oscillator reassuming its normal fundamental frequency whenever the respective output pulse is terminated.

The typical circuitries for driving LEDs generate pulses with a duty ratio of 1:1, the pulse length being as long as the pulse interval. By this invention, the duty ratio is individually changed. In an advantageous embodiment of the invention, a diode is further connected in parallel to the frequency-determining component. This diode effects an additional change of the duty ratio by shortening the pulse intervals.

Hereinafter, an embodiment of the invention is explained in detail with reference to the only FIGURE of the drawing.

BRIEF DESCRIPTION OF THE DRAWINGS

The single FIGURE of the drawing shows a schematic circuit diagram of the circuit according to the invention.

DESCRIPTION OF THE PREFERRED EMBODIMENTS

The circuitry comprises a basic circuit 10 which preferably is configured as an integrated circuit. This basic circuit includes, among other things, an oscillator 11 with an inverting Schmitt trigger 12 whose output is fed back to the input via a resistor 13, the amplifier input being further connected to a capacitor 14. In the feedback path of the Schmitt trigger 12, a frequency-determining component 15 in the form of a resistor is provided in parallel with the resistor 13, said component 15 being externally connected to the basic circuit 10 so that the user can set the fundamental frequency of the oscillator 11 by selecting an appropriate resistor.

Further, the basic circuit 10 comprises several outputs A1–A5. Each of these outputs is controlled via a transistor T1–T5, which applies a negative pulse (ground potential) to this output when driven into the conductive state. The transistors T1–T5 are successively driven by the oscillator circuit 11, wherein the transistor T1 supplies a pulse, a pulse interval of the same duration occurs thereafter, and the transistor T2 supplies a pulse, etc.

A load L1–L5 in the form of an LED is connected to each of the outputs A1–A5. All LEDs are interconnected at their other terminals and connected, via a resistor 16, to the positive pole of a voltage source 17 whose negative pole is connected to ground potential. When an output pulse (ground potential) occurs at one of the outputs A1–A5, the respective LED lights up.

The circuitry described so far is known. It provides pulses of identical durations at each of the outputs A1–A5, the pulses cyclically succeeding each other at the outputs A1–A5 and the output A1 being activated subsequent to the output A5.

According to the invention, a switch 18 is connected in parallel to the frequency-determining component 15, which is a resistor here. The switch 18 is a transistor whose emitter is connected to the one end of the frequency-determining component 15 and whose collector is connected to the other end thereof. The base is connected to the resistors R1–R4, among which the resistor R1 is connected to the output A1, the resistor R2 to the output A2 etc. Here, no corresponding resistor is provided for the output A5, i.e. output A5 cannot control the switch 18.

Further, the base of the switch 18 is connected to the positive pole of the supply source 17 via a diode 22 which is connected in the same direction as the emitter-base diode of the switch 18, and a resistor R20.

When an output signal (pulse of ground potential) occurs at one of the outputs A1–A4, the respective resistor R1–R4, together with the resistor R20, forms a voltage divider through which a specified potential is applied to the base of the switch 18, and the switch 18 is driven into the conductive state. Together with the named resistors R1–R4 and R20, the switch 18 forms a current source 19 supplying a constant current whose magnitude depends on the value of the respective resistor R1–R4. The diode 22 serves to compensate for the voltage drop of the emitter-base diode of the switch 18 which is normally non-conductive.

When a pulse (ground potential) occurs at the output A5, the fundamental frequency of the oscillator 11 is not changed thereby, because the output A5 is not connected to the switch 18 here. Consequently, the oscillator 11 oscillates at that frequency established by the frequency-determining component 15. When the pulse at the output A5 is terminated, the next pulse is generated at the output A1 after a pulse interval. When the output A1 assumes ground potential, the base of the switch 18 becomes negative, whereby the switch 18 acts as current source transistor and conducts a constant current which depends on the value of R1. As a result of the impedance now connected in parallel to the frequency-determining component 15, the frequency of the oscillator 11 is increased. This means that the oscillator 11 oscillates back earlier and prematurely terminates the pulse at the output A1. When the pulse at the output A1 is terminated, the switch 18 is driven into the non-conductive state again and the oscillator 11 again oscillates at fundamental frequency.

By appropriately selecting the resistors R1–R4, the pulse durations by which the loads L1–L4 are driven can be individually influenced.

A diode 21 is connected antiparallel to the switch 18, i.e. connected in parallel to a polarity opposite to that of the emitter-base diode 22 of the switch 18. This diode 21 shortens the pulse intervals between the pulses down to almost zero so that the pulses generated at the outputs A1–A5 can succeed each other in immediate sequence.

Although a preferred embodiment of the invention has been specifically illustrated and described herein, it is to be understood that minor variations may be made in the apparatus without departing from the spirit and scope of the invention, as defined the appended claims.

I claim:

1. A circuit for cyclically driving several loads (L1–L5) comprising a basic circuit (10) including a logic circuit (LC) and an oscillator (11) for cooperatively generating successive pulses at several outputs (A1–A5), the oscillator (11) being connected to a frequency-determining component (15), at least one of the outputs (A1–A5) controls a switch (18) connected to said frequency-determining component (15), and said switch (18) changes the oscillator frequency only for a duration corresponding to the duration of a generated pulse when a generated pulse occurs at said outputs (A1–A5).

2. The circuitry according to claim 1, characterized in that a diode (21) is connected in parallel to the frequency-determining component (15).

3. The circuit according to claim 1, characterized in that the switch (18) is connected as a current source (19) supplying a constant current when switched on.

4. The circuit according to claim 3 wherein the current source (19) is connected in parallel to the frequency-determining component (15) between an input and an output thereof.

5. The circuitry according to claim 3, characterized in that the current source (19) includes a resistor (20) connected to one pole of the supply voltage.

6. The circuit according to claim 3, characterized in that the current source (19) includes a resistor (R1–R4) which connects the outputs (A1–A4) of the basic circuit (10) to the switch (18) and whose value determines the change of the oscillator frequency.

7. The circuitry according to claim 6, characterized in that the resistors are (R1–R4) is connected to the base of a current source transistor which is connected in parallel to the frequency-determining component (15) between the input and output thereof.

* * * * *